(12) United States Patent
Young

(10) Patent No.: US 6,257,368 B1
(45) Date of Patent: Jul. 10, 2001

(54) ROTATING SHAFT ASSEMBLY

(75) Inventor: Jack R. Young, Nineveh, IN (US)

(73) Assignee: Reliance Electric Technologies, LLC, Thousand Oaks, CA (US)

( * ) Notice: Subject to any disclaimer, the term of this patent is extended or adjusted under 35 U.S.C. 154(b) by 0 days.

(21) Appl. No.: 09/406,562

(22) Filed: Sep. 27, 1999

(51) Int. Cl.[7] ...................................... F01M 1/00
(52) U.S. Cl. .................. 184/6.12; 184/7.1; 384/466; 384/473
(58) Field of Search ................................ 184/6.12, 7.1, 184/106; 384/473, 466

(56) References Cited

U.S. PATENT DOCUMENTS 4,782,919 * 11/1988 Chalaire et al. .................... 184/6.11
6,126,411 * 10/2000 Flanigan et al. .................... 417/313

* cited by examiner

*Primary Examiner*—David Fenstermacher
(74) *Attorney, Agent, or Firm*—Lloyd G. Farr; A. M. Gerasimow

(57) ABSTRACT

A rotating shaft assembly includes a housing that defines a bore that extends from an area exterior to the housing to an area interior to the housing. A shaft is rotatably disposed in the housing about an axis of the bore. The shaft extends through the bore between the interior and exterior areas. A lubricant retention area is axially outward of, and sealed from, the interior area. The retention is configured to collect lubricant from the interior area. A sump is in fluid communication with the interior area. A drain extends between the retention area and the sump. A check valve is disposed in the drain. The check valve is oriented to permit lubricant flow from the retention area to the sump and to prevent lubricant flow from the sump to the retention area.

19 Claims, 3 Drawing Sheets

ROTATING SHAFT ASSEMBLY

BACKGROUND OF THE INVENTION

The present invention relates generally to rotating shaft assemblies such as bearings and gear reducers. More particularly, the invention relates to such assemblies having an improved lubricant drain arrangement.

As should be understood in this art, gear reducers, bearings and other such devices include housings that define interior areas in which gears, bearings and other moving parts are located. This area typically contains lubricant that is moved about the interior during operation and defines a lower portion, or sump, in which the lubricant collects.

The housing defines one or more bores extending through its walls and through which a shaft extends. The area between the housing bore and the shaft is sealed to prevent lubricant escape and to prevent ingress of exterior contaminants. The seal may include one or more seal elements between which lubricant may collect.

SUMMARY OF THE INVENTION

The present invention recognizes and addresses disadvantages of prior art constructions and methods.

Accordingly, it is an object of the present invention to provide a rotating shaft assembly having an improved lubricant seal and drain arrangement.

This and other objects are accomplished by a rotating shaft assembly having a housing that defines a bore that extends from an area exterior to the housing to an area interior to the housing. A shaft is rotatably disposed in the housing about an axis of the bore. The shaft extends through the bore between the interior area and the exterior area. A lubricant retention area is axially outward of, and sealed from, the interior area. The retention area is configured to collect lubricant from the interior area. A sump is in fluid communication with the interior area. A drain extends between the retention area and the sump. A check valve is disposed in the drain. The check valve is oriented to permit lubricant flow from the retention area to the sump and to prevent lubricant flow from the sump to the retention area.

BRIEF DESCRIPTION OF THE DRAWINGS

A full and enabling disclosure of the present invention, including the best mode thereof, to one of ordinary skill in the art is set forth more particularly in the remainder of the specification, including reference to the accompanying figures, in which.

Figure 1:
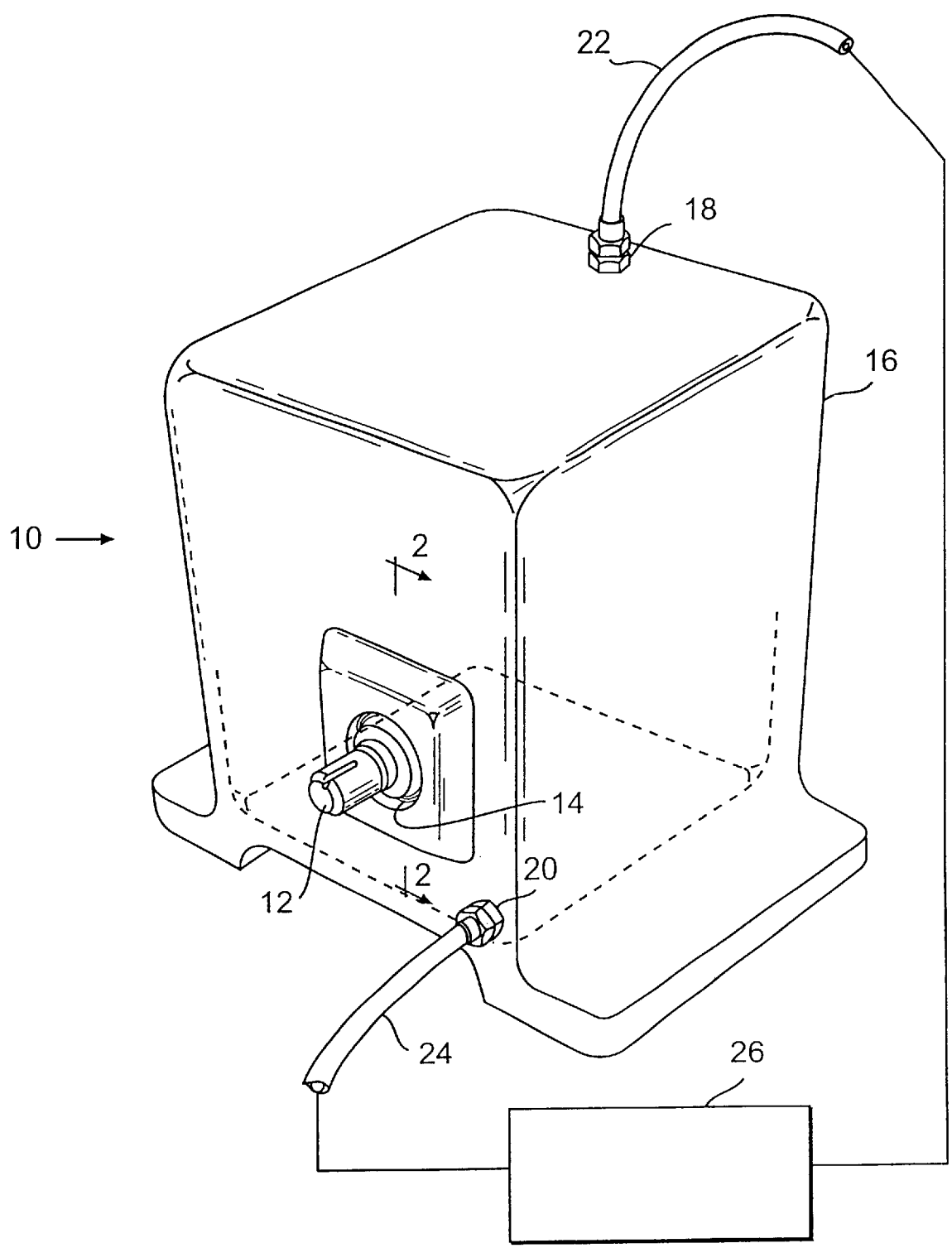
FIG. 1 is a perspective view of a rotating shaft assembly according to a preferred embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 illustrates a gear reducer 10 having an output shaft 12 extending through a bore 14 in a housing 16. While the figures illustrate a gear reducer, it should be understood that the present invention may comprise a variety of mechanisms, such as motors, bearings and couplings, that include one or more rotating shafts extending through a housing from an exterior to an interior area. In these devices, a seal may be used to retain lubricant within the interior area and/or to prevent the ingress of exterior contaminants.

As should be understood in this art, the housing of gear reducer 10 encloses an interior area in which is disposed a series of step-down gears that drive output shaft 12 in response to a driven input shaft (not shown). Lubricant is introduced into the interior through a fitting 18 and can be drained through a fitting 20. Fittings 18 and 20 may be normally closed during operation of the gear reducer or may remain open to tubing 22 and 24 to pass lubricant through a cooling stage 26.

Figure 2:
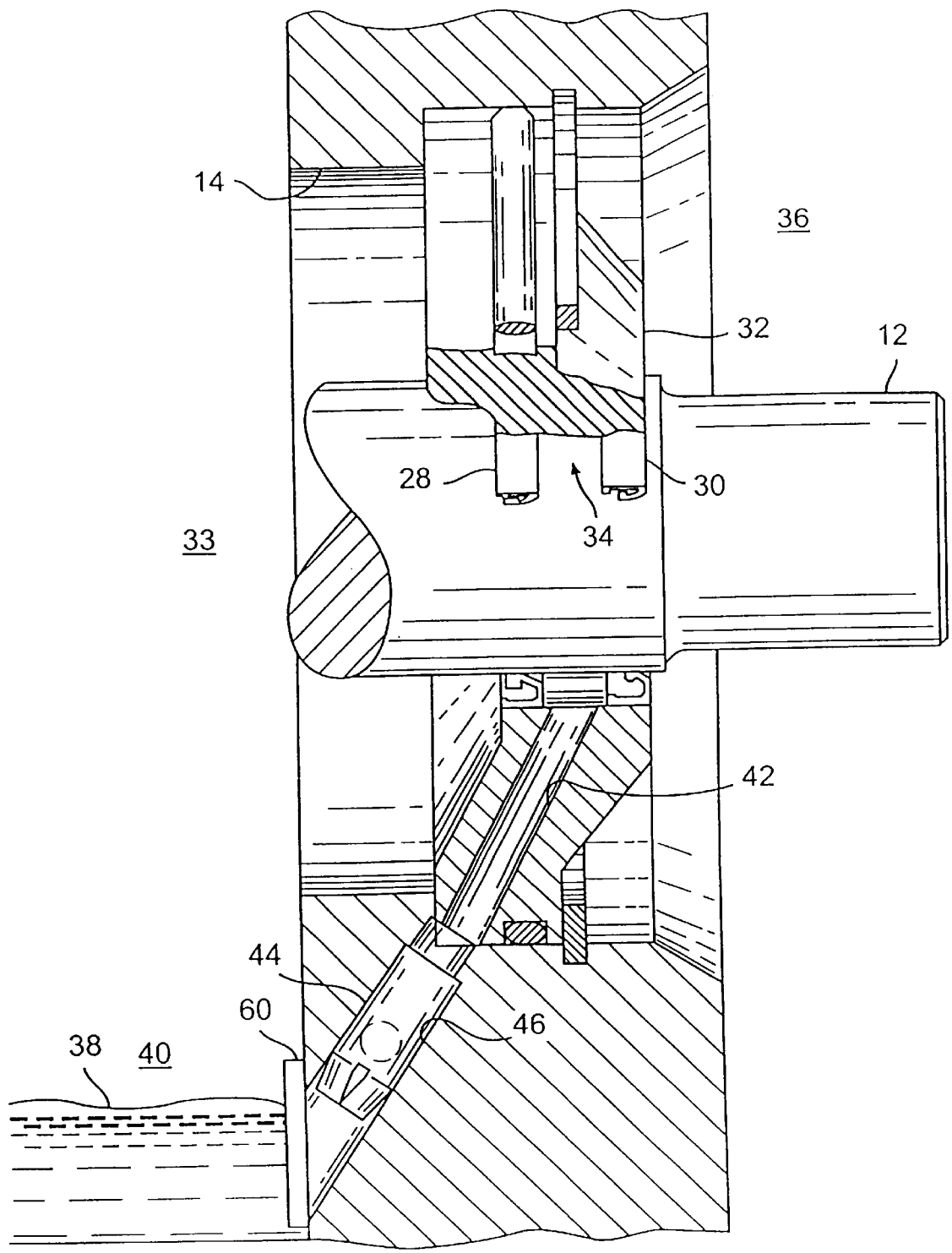
FIG. 2 is a partial cross-sectional view of the assembly as in FIG. 1 taken along the line 2—2.

Referring now to FIG. 2, shaft 12 is secured radially in bore 14 by a suitable bearing (not shown) as should be understood in this art. A pair of millright seals 28 and 30 are attached to housing 16 by an aluminum carrier 32 and extend radially inward to abut the outer surface of shaft 12. The seals are flexible and can be made from any suitable material, for example a polymer such as an hydrogenated nitrile.

Seals 28 and 30 each includes a base that is fixed to the carrier, for example by an adhesive or other suitable means, and an arm that extends radially inward toward the shaft and axially inward toward an interior area 33 of housing 16. The seals remain fixed with respect to the housing as the shaft rotates.

Turbulence in area 33 agitates lubricant 38, creating heat and increasing pressure. Seal 28 permits a certain amount of lubricant under pressure to seep into a retention area 34 between seals 28 and 30. The lubricant in area 34 is under less pressure than lubricant in the housing interior, and seal 30 therefore generally prevents the lubricant from leaking out into exterior area 36. A minimal amount of lubricant may, however, weep past seal 30. It should be recognized that seals 28 and 34 may form a labyrinth seal arrangement.

It should be understood that various seal arrangements may be used within the present invention. For example, one or more seals may extend from either the housing or the shaft to sealingly engage the other of the housing and the shaft, for example to form a contacting or non-contacting seal therewith.

Lubricant 38 collects in a sump area 40. The sump is within interior 33 and below retention area 34 when the gear reducer is in its operative position. A generally cylindrical bore 42 extends through housing 16, including carrier 32, between area 34 and sump 40 and permits return of lubricant to the sump.

Figure 3:
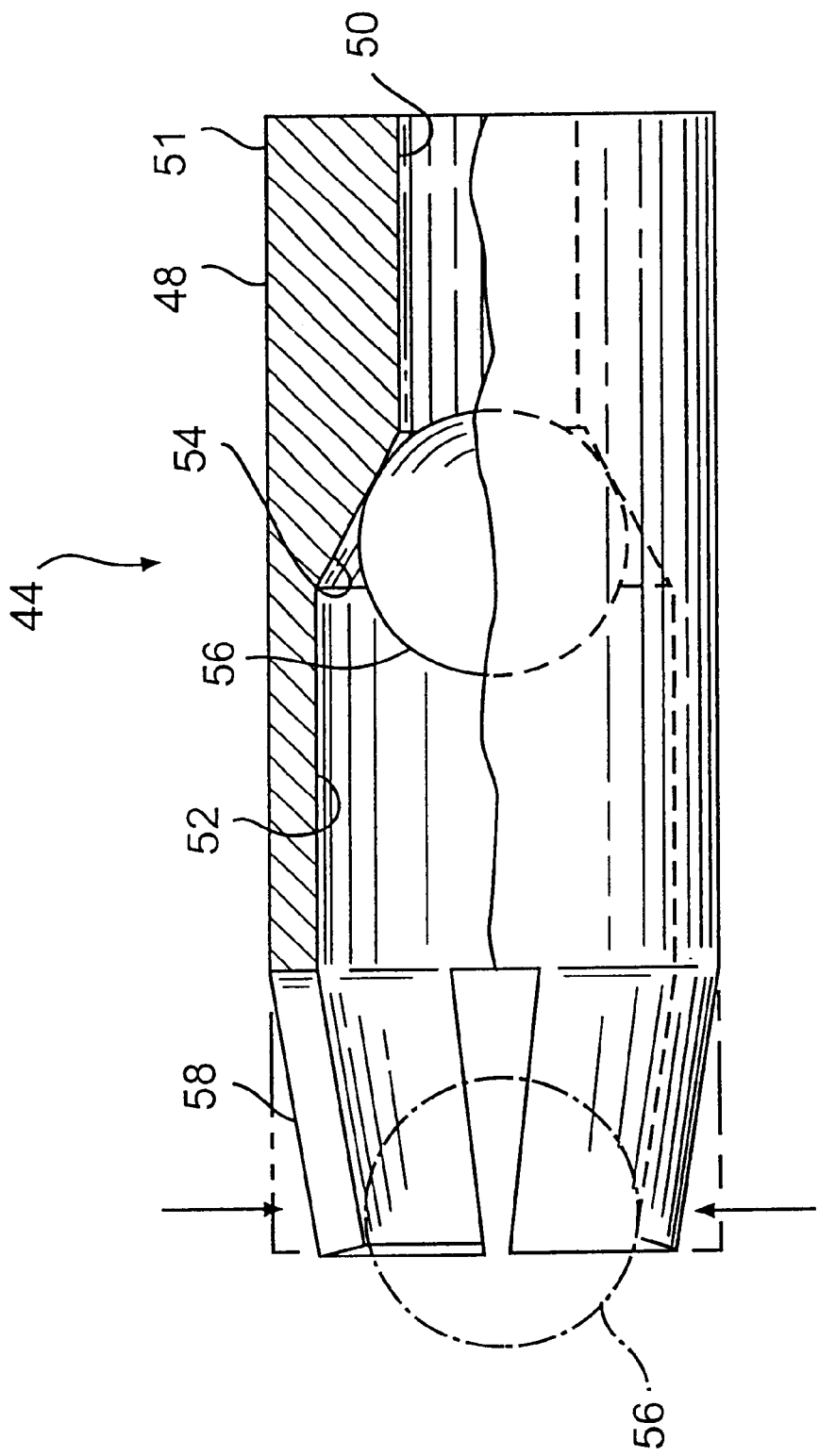
FIG. 3 is a cutaway view of a check valve for use in a preferred embodiment of the present invention.

A check valve 44 is disposed in a countersunk portion 46 of drain 42 to prevent backflow of lubricant 38 through drain 42 but to allow air flow in either direction. Referring also to FIG. 3, check valve 44 includes a metal, for example aluminum, body 48 with an internal cavity extending therethrough. The cavity includes an upstream portion 50 and a downstream portion 52 that has a larger diameter than upstream portion 50. A frustoconical transition 54 connects the upstream and downstream portions. A plunger 56 is disposed in downstream area 52, and ends 58 of body 48 are crimped to prevent the ball's escape. In the illustrated embodiment, the plunger is a polypropylene ball having a diameter greater than the diameter of upstream cavity portion 50.

Preferably, ball 56 is constructed to prevent backflow of lubricant 38 from sump 40 (FIG. 2) through body 48 but to permit airflow from the sump through the drain to area 34. Lubricant flow from the sump into the check valve pushes the ball against transition surface 54, thereby blocking upstream portion 50 and preventing further lubricant flow. Air backflow, however, is typically unable to move the ball and is therefore allowed to pass to the retention area. In the opposite direction, when air or lubricant flows through the drain from area 34 to the sump, ball 56 remains in the lower position shown in phantom in FIG. 3.

The construction of the plunger may vary depending, for example, on the construction of the check valve and on the lubricant used. It should be understood that all suitable constructions are within the scope of the present invention.

To facilitate assembly, drain portion 46 may be formed as a straight bore, i.e. without a countersink, so that the check valve may be inserted into the drain from the drain's intersection with retention area 34. The outer diameter of upper end 51 of body 48 may be slightly enlarged, for example by an O-ring received in an annular groove about the body, so that the body may be securely pressed into drain portion 46.

In order to reduce backflow pressure into the drain, an optional baffle plate 60 may be mounted to the housing at the interface between drain 42 and sump 40. As should be understood in this art, the baffle plate may comprise, for example, a series of overlapping plate stages or a perforated sheet to reduce pressure of fluid passing through the plate.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. A rotating shaft assembly, said assembly comprising:
   a housing defining a bore that extends from an area exterior to said housing to an area interior to said housing;
   a shaft rotatably disposed in said housing about an axis of said bore, said shaft extending through said bore between said interior area and said exterior area;
   a lubricant retention area axially outward of, and sealed from, said interior area, said retention area defining a pressure therein less than pressure defined within said interior area and being configured to collect lubricant from said interior area therein;
   a sump in fluid communication with said interior area;
   a drain extending between said retention area and said sump; and
   a check valve disposed in said drain, said check valve oriented to permit lubricant flow from said retention area to said sump and to prevent lubricant flow from said sump to said retention area.

2. A rotating shaft assembly, said assembly comprising:
   a housing defining a bore that extends from an area exterior to said housing to an area interior to said housing;
   a shaft rotatably disposed in said housing about an axis of said bore, said shaft extending through said bore between said interior area and said exterior area;
   a first seal disposed in said bore and attached to one of said shaft and said housing, said first seal extending from said one of said shaft and said housing to which said first seal is attached to sealingly engage the other of said shaft and said housing;
   a second seal disposed in said bore axially outward of said first seal and attached to one of said shaft and said housing, said second seal extending from said one of said shaft and said housing to which said second seal is attached to sealingly engage the other of said shaft and said housing;
   a lubricant retention area defined between said first seal and said second seal axially outward of said interior area;
   a sump in fluid communication with said interior area;
   a drain extending between said retention area and said sump; and
   a check valve disposed in said drain, said check valve oriented to permit lubricant flow from said retention area to said sump and to prevent lubricant flow from said sump to said retention area.

3. An assembly as in claim 2, wherein said sump is disposed below said interior area and said retention area when said assembly is in an operative position.

4. An assembly as in claim 2, wherein said drain is defined by a generally cylindrical bore in said housing.

5. An assembly as in claim 4, wherein said check valve includes
   a generally cylindrical body received by said bore and defining an interior cavity extending through said body, wherein said interior cavity has an upstream section proximate said retention area and a downstream section proximate said sump, and wherein said upstream section has a smaller cross-sectional area than said downstream section,
   an interface between said upstream section and said downstream section, and
   a plunger disposed in said downstream section so that said plunger is axially movable with lubricant flow through said downstream section, wherein said plunger has a cross-sectional area greater than said upstream section and wherein said plunger is configured with respect to said interface to seal said upstream section from said downstream section at said interface upon upstream flow pressure of said lubricant in said downstream section.

6. An assembly as in claim 5, wherein said interface is defined by a frustoconical section of said cavity and wherein said plunger includes a spherical ball having a diameter greater than the smallest diameter of said frustoconical section.

7. An assembly as in claim 6, wherein said ball has a specific gravity sufficient to permit air flow from said downstream section into said upstream section through said interface.

8. An assembly as in claim 7, wherein said specific gravity is within a range of approximately 0.90 to 0.91.

9. An assembly as in claim 8, wherein said ball is constructed of polypropylene.

10. An assembly as in claim 2, wherein said check valve is configured to permit flow of air from said sump to said retention area.

11. An assembly as in claim 2, wherein said check valve includes
   a body received by said drain and defining an interior cavity extending through said body, wherein said interior cavity has an upstream section proximate said retention area and a downstream section proximate said sump, and wherein said upstream section has a smaller cross-sectional area than said downstream section,
   an interface between said upstream section and said downstream section, and
   a plunger disposed in said downstream section so that said plunger is axially movable with lubricant flow through said downstream section, wherein said plunger has a cross-sectional area greater than said upstream section and wherein said plunger is configured with respect to said interface to seal said upstream section from said downstream section at said interface upon upstream flow pressure of said lubricant in said downstream section.

12. An assembly as in claim 11, wherein said plunger has a specific gravity sufficient to permit air flow from said downstream section into said upstream section through said interface.

13. An assembly as in claim 12, wherein said specific gravity is within a range of approximately 0.90 to 0.91.

14. A gear reducer, said gear reducer comprising:
   a housing defining a bore that extends from an area exterior to said housing to an area interior to said housing;
   a shaft rotatably disposed in said housing about an axis of said bore, said shaft extending through said bore between said interior area and said exterior area;
   a lubricant retention area axially outward of, and sealed from, said interior area, said retention area defining a pressure therein less than pressure defined within said interior area and being configured to collect lubricant from said interior area therein;
   a sump in fluid communication with said interior area;
   a drain extending between said retention area and said sump; and
   a check valve disposed in said drain, said check valve oriented to permit lubricant flow from said retention area to said sump and to prevent lubricant flow from said sump to said retention area.

15. A gear reducer, said gear reducer comprising:
   a housing defining a bore that extends from an area exterior to said housing to an area interior to said housing;
   a shaft rotatably disposed in said housing about an axis of said bore, said shaft extending through said bore between said interior area and said exterior area;
   a lubricant retention area axially outward of, and sealed from, said interior area, said retention area being configured to collect lubricant from said interior area therein;
   a sump in fluid communication with said interior area;
   a drain extending between said retention area and said sump; and
   a check valve disposed in said drain, said check valve oriented to permit lubricant flow from said retention area to said sump and to prevent lubricant flow from said sump to said retention area,
   wherein said check valve includes
   a body received by said drain and defining an interior cavity extending through said body, wherein said interior cavity has an upstream section proximate said retention area and a downstream section proximate said sump, and wherein said upstream section has a smaller cross-sectional area than said downstream section,
   an interface between said upstream section and said downstream section, and
   a plunger disposed in said downstream section so that said plunger is axially movable with lubricant flow through said downstream section, wherein said plunger has a cross-sectional area greater than said upstream section and wherein said plunger is configured with respect to said interface to seal said upstream section from said downstream section at said interface upon upstream flow pressure of said lubricant in said downstream section.

16. An assembly as in claim 15, wherein said interface is defined by a frustoconical section of said cavity and wherein said plunger includes a spherical ball having a diameter greater than the smallest diameter of said frustoconical section.

17. An assembly as in claim 16, wherein said ball has a specific gravity sufficient to permit air flow from said downstream section into said upstream section through said interface.

18. A gear reducer, said gear reducer comprising:
   a housing defining a bore that extends from an area exterior to said housing to an area interior to said housing;
   a shaft rotatably disposed in said housing about an axis of said bore, said shaft extending through said bore between said interior area and said exterior area;
   a first seal disposed in said bore and attached to said housing, said first seal extending from said housing to sealingly engage said shaft;
   a second seal disposed in said bore axially outward of said first seal and attached to said housing, said second seal extending from said housing to sealingly engage said shaft;
   a lubricant retention area defined between said first seal and said second seal axially outward of said interior area;
   a sump in fluid communication with said interior area and disposed below said interior area and said retention area when said gear reducer is in an operative position;
   a drain extending between said retention area and said sump; and
   a check valve disposed in said drain, wherein
      said check valve is oriented to permit lubricant flow from said retention area to said sump and to prevent lubricant flow from said sump to said retention area, and
      said check valve is configured to permit air flow from said sump to said retention area and from said retention area to said sump.

19. A gear reducer as in claim 18, wherein
   said drain is defined by a generally cylindrical bore in said housing, said check valve includes
- a generally cylindrical body received by said bore and defining an interior cavity extending through said body, wherein said interior cavity has an upstream section proximate said retention area and a downstream section proximate said sump area,
- a generally frustoconical interface between said upstream section and said downstream section, and
- a generally spherical ball disposed in said downstream section so that said ball is axially movable with lubricant flow through said downstream section, wherein said ball has a diameter greater than the smallest diameter of said frustoconical interface, and said ball has a specific gravity sufficient so that said ball seals said upstream section from said downstream section at said interface upon upstream flow pressure of said lubricant in said downstream section and so that air flow is permitted from said sump to said retention area.

* * * * *